United States Patent
Fujinoki

(10) Patent No.: US 10,686,216 B2
(45) Date of Patent: Jun. 16, 2020

(54) SOLID ELECTROLYTE HAVING FILLER EMBEDDED IN ALKALINE-EARTH METAL CONTAINING MATRIX, AND SECONDARY BATTERY INCLUDING THE SAME

(71) Applicant: Panasonic Intellectual Property Management Co., Ltd., Osaka (JP)

(72) Inventor: Norihito Fujinoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 161 days.

(21) Appl. No.: 15/869,045

(22) Filed: Jan. 12, 2018

(65) Prior Publication Data

US 2018/0261876 A1    Sep. 13, 2018

(30) Foreign Application Priority Data

Mar. 13, 2017 (JP) ................... 2017-046868

(51) Int. Cl.
*H01M 10/054* (2010.01)
*H01M 10/0568* (2010.01)
(Continued)

(52) U.S. Cl.
CPC ......... *H01M 10/054* (2013.01); *H01M 2/166* (2013.01); *H01M 2/1646* (2013.01); *H01M 4/1391* (2013.01); *H01M 4/386* (2013.01); *H01M 4/466* (2013.01); *H01M 10/0562* (2013.01); *H01M 10/0568* (2013.01); *H01M 2300/008* (2013.01); *H01M 2300/0068* (2013.01)

(58) Field of Classification Search
CPC .. H01M 2/1646; H01M 2/166; H01M 4/1391; H01M 4/386; H01M 4/466; H01M 10/054; H01M 10/0562; H01M 10/0568
USPC .................................. 429/251, 304
See application file for complete search history.

(56) References Cited

U.S. PATENT DOCUMENTS 3,547,700 A * 12/1970 Swindells ............. H01M 6/182
                                                                429/318
3,837,920 A *  9/1974 Liang ...................... H01M 6/18
                                                                429/323

(Continued)

FOREIGN PATENT DOCUMENTS

JP      2011-086548 A      4/2011
JP      2016-126928         7/2016
(Continued)

OTHER PUBLICATIONS

M.A.K.L. Dissanayake et al., "Thermal and Electrical Properties of Solid Polymer Electrolyte PEO9Mg(ClO4)2 Incorporating Nano-Porous Al2O3 Filler", Solid State Ionics 177 (2006), Jan. 31, 2006, pp. 343-346.

(Continued)

*Primary Examiner* — Sean P Cullen
(74) *Attorney, Agent, or Firm* — McDermott Will & Emery LLP

(57) ABSTRACT

A solid electrolyte includes: a matrix containing, as a solid salt, at least one selected from the group consisting of (i) a metal halide containing an alkaline-earth metal and (ii) a metal compound containing the alkaline-earth metal and fluorine; and one or more fillers embedded in the matrix.

10 Claims, 8 Drawing Sheets

(51) Int. Cl.
  *H01M 4/46* (2006.01)
  *H01M 4/1391* (2010.01)
  *H01M 4/38* (2006.01)
  *H01M 10/0562* (2010.01)
  *H01M 2/16* (2006.01)

(56) References Cited

U.S. PATENT DOCUMENTS

| | | | | |
|---|---|---|---|---|
| 4,307,163 | A * | 12/1981 | Joshi | H01M 6/18 |
| | | | | 429/199 |
| 2007/0154762 | A1 * | 7/2007 | Schucker | B32B 18/00 |
| | | | | 429/129 |
| 2009/0004560 | A1 | 1/2009 | Amatucci et al. | |
| 2010/0221614 | A1 * | 9/2010 | Bertin | C08F 293/005 |
| | | | | 429/309 |
| 2013/0017432 | A1 | 1/2013 | Roumi | |
| 2016/0294028 | A1 | 10/2016 | Ye | |
| 2017/0133717 | A1 | 5/2017 | Makino et al. | |

FOREIGN PATENT DOCUMENTS

| | | |
|---|---|---|
| WO | 2015/152469 A1 | 10/2015 |
| WO | 2016/136924 | 9/2016 |

OTHER PUBLICATIONS

Amrita Jain et al., "Experimental studies on high-performance supercapacitor based on nanogel polymer electrolyte with treated activated charcoal", Ionics (2013) 19, Aug. 5, 2012, pp. 549-557.
Mazdida Sulaiman et al., "Structural, thermal and conductivity studies of magnesium nitrate -alumina composite solid electrolytes prepared via sol-gel method", International Journal of electrochemical Science, 8 (5). May 9, 2013, pp. 6647-6655.
The Extended European Search Report dated Jun. 13, 2018 for the related European Patent Application No. 18158501.9.
The Extended European Search Report dated Jan. 16, 2020 for the related European Patent Application No. 18158501.9.
Benjamin Ruprecht et al: "Anion diffusivity in highly conductive nanocrystalline $BaF_2$:$CaF_2$ composites prepared by high-energy ball milling", Journal of Materials Chemistry, vol. 18, No. 44, Jan. 1, 2008 (Jan. 1, 2008), p. 5412, XP055523543.
HJ. Matzke et al: "Diffusion van Ca-45 in $CaF_2$", Tri Zeitschrift Fuer Naturforschung A, A Journal of Physical Sciences, vol. 19, No. 10, Oct. 1, 1964 (Oct. 1, 1964), pp. 1178-1180, XP055656530.
Akila R et al: "Combined homo-hetero doping for enhancement of ionic conductivity", Solid State Ionics, North Holland Pub. Company. Amsterdam; NL, NL, vol. 25, No. 2-3, Nov. 1, 1987 (Nov. 1, 1987), pp. 217-221, XP024609936.

* cited by examiner

SOLID ELECTROLYTE HAVING FILLER EMBEDDED IN ALKALINE-EARTH METAL CONTAINING MATRIX, AND SECONDARY BATTERY INCLUDING THE SAME

BACKGROUND

1. Technical Field

The present disclosure relates to a solid electrolyte and a secondary battery including the solid electrolyte.

2. Description of the Related Art

In recent years, secondary batteries having multivalent ion conductivity have been expected to be put into practical use. Among these batteries, magnesium secondary batteries have a higher theoretical capacity density than lithium ion batteries in the related art.

International Publication No. 2016/136924 discloses a gel electrolyte produced by dissolving a magnesium salt in an ionic liquid and adding inorganic nanofibers thereto.

The paper of M. A. K. L. Dissanayake et al. ("*Thermal and Electrical Properties of Solid Polymer Electrolyte $PEO_9Mg(ClO_4)_2$ Incorporating Nano-Porous $Al_2O_3$ Filler*" Solid State Ionics 177 (2006) pp. 343-346) discloses a polymer electrolyte produced by dissolving magnesium perchlorate ($Mg(ClO_4)_2$) in a polyethylene oxide) (PEO) and adding $Al_2O_3$ thereto.

SUMMARY

In one general aspect, the techniques disclosed here feature a solid electrolyte including: a matrix containing, as a solid salt, at least one selected from the group consisting of (i) a metal halide containing an alkaline-earth metal and (ii) a metal compound containing the alkaline-earth metal and fluorine; and one or more fillers embedded in the matrix.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Some solid electrolytes according to embodiments will be described in detail below with reference to the attached drawings.

The following descriptions indicate the comprehensive or specific embodiments. The numerical values, compositions, shapes, thickness, structures and electrode materials of secondary batteries, and so forth described below are merely examples and are not intended to limit the scope of the present disclosure. Furthermore, elements that are not described in independent claims representing the broadest concept are described as optional elements.

While a solid electrolyte used for a secondary battery will be mainly described below, the applications of the solid electrolyte according to the present disclosure are not limited thereto. The solid electrolyte may be used for, for example, an electrochemical device such as an ion-concentration sensor.

Hereinafter, for convenience of description, the phrase "at least one selected from the group consisting of (i) a metal halide containing an alkaline-earth metal and (ii) a metal compound containing an alkaline-earth metal and fluorine" is also referred to simply as an "alkaline-earth metal salt".

EMBODIMENTS

[1. Solid Electrolyte]

[1-1. Structure of Solid Electrolyte]

Figure 1:
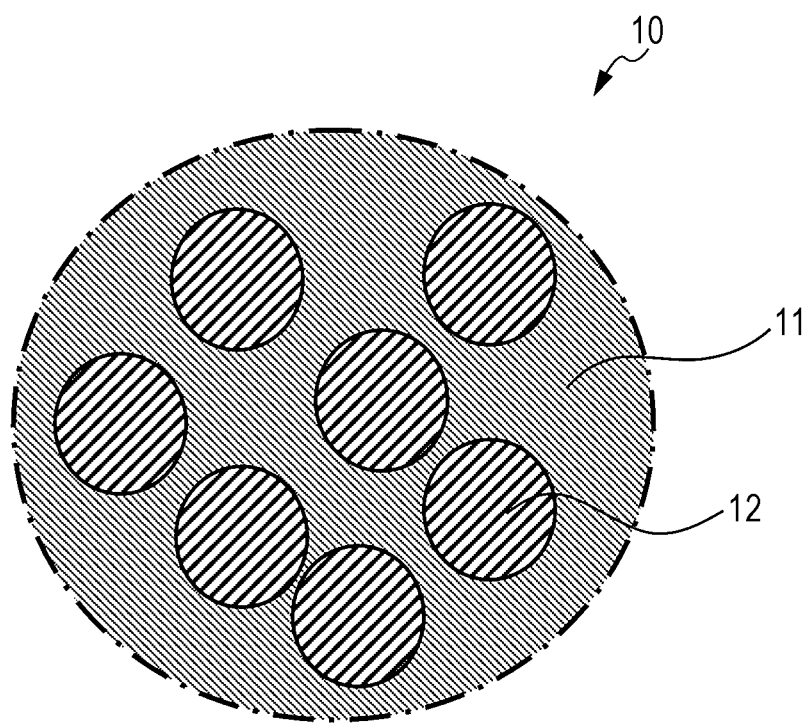
FIG. 1 is an enlarged schematic cross-sectional view of the structure of a solid electrolyte according to an embodiment.

FIG. 1 illustrates the structure of a solid electrolyte 10 according to the embodiment. FIG. 1 schematically illustrates a region of the cross section of the solid electrolyte 10. The solid electrolyte 10 includes a matrix 11 and inorganic oxide fillers 12. The matrix 11 contains, as a solid salt, at least one selected from the group consisting of (i) a metal halide containing an alkaline-earth metal and (ii) a metal compound containing the alkaline-earth metal and fluorine. In FIG. 1, the inorganic oxide fillers 12 are formed of fine particles and dispersed in the matrix 11.

The solid electrolyte 10 can have good alkaline-earth metal ion conductivity as described in examples below. A possible reason for this is as follows: In the solid electrolyte 10, the matrix 11 containing an alkaline-earth metal salt as a solid salt is in contact with the respective inorganic oxide fillers 12. At or near the interfaces between them, there are supposed to be vacancies of alkaline-earth metal ions and/or space charge regions, through which the migration of the alkaline-earth metal ions is promoted. This enables the ionic conductivity of the solid electrolyte 10 to be enhanced.

Typically, ions of divalent alkaline-earth metals have high electrostatic interactions with anions in solid-state materials and therefore are hardly diffused therein, compared with ions of monovalent alkali metals such as lithium ions. In order to realize a solid electrolyte having alkaline-earth metal ion conductivity, an improvement in ionic conductivity thereof is required. To this request, the solid electrolyte 10 according to the embodiment can exhibit high ionic conductivity. This technique is useful for an alkaline-earth metal salt that shows very low or no ionic conductivity if it is used in a conventional manner.

The solid electrolyte 10 is in the form of, for example, a layer. The layer has a thickness of, for example, 1 μm or more and 50 μm or less. This can not only secure safety such as short-circuit protection, but also can reduce resistance to the conduction of the alkaline-earth metal ions. For example, in the case where the solid electrolyte 10 has an ionic conductivity of $1\times10^{-5}$ S/cm and a thickness of 5 μm, the solid electrolyte 10 can have a resistance per unit area of 50 $\Omega\cdot cm^2$ or less.

[1-2. Matrix]

The matrix 11 contains, as a solid salt, at least one selected from the group consisting of (i) a metal halide containing an alkaline-earth metal and (ii) a metal compound containing the alkaline-earth metal and fluorine. The term "solid salt" used in present disclosure refers to a salt present in a solid state and is different from a salt dissolved in a solvent or polymer.

The metal halide may contain substantially only an alkaline-earth metal as a metal element. The metal compound may contain substantially only an alkaline-earth metal as a metal element. The expression "containing substantially only an alkaline-earth metal as a metal element" used here indicates that a metal element other than the alkaline-earth metal is not intentionally added. That is, the alkaline-earth metal salt may be at least one selected from the group consisting of a halide of an alkaline-earth metal and a fluorine-containing compound of the alkaline-earth metal.

The matrix 11 contains an alkaline-earth metal salt as a main component. The term "main component" used in the present disclosure refers to a component that accounts for more than 50% by weight of the matrix. This can result in an increased concentration of the alkaline-earth metal ions in the matrix 11 and thereby improved ionic conductivity in the solid electrolyte. The matrix 11 may have an alkaline-earth metal salt content of more than 80% by weight and even more than 95% by weight. Note that in conventional reports regarding matrices in which metal salts are dissolved in ionic liquids or polymers, the weight percentages of metal salts in the matrices are about several percent by weight to about 40% by weight.

The halide of the alkaline-earth metal and the fluorine-containing compound of the alkaline-earth metal have relatively lower lattice energy than other alkaline-earth metal salts. Thus, the matrix 11 containing the halide of the alkaline-earth metal and/or the fluorine-containing compound of the alkaline-earth metal can easily dissociate the alkaline-earth metal ions even when the matrix 11 contains the inorganic oxide fillers 12.

Typically, the larger the radius of an anion of the alkaline-earth metal salt is, the lower lattice energy thereof is. Thus, the alkaline-earth metal salt in the matrix 11 may be designed such that the anion thereof has a radius of 1.6 Å or more and even 2.0 Å or more, and/or that a lattice energy thereof is less than 3,500 kJ/mol, for example, less than 2,800 kJ/mol, and even less than 2,000 kJ/mol.

The halide of the alkaline-earth metal contains at least one selected from the group consisting of chlorides, bromides, iodides, and perchlorates. In other words, examples of the anion in the halide of the alkaline-earth metal include $Cl^-$, $Br^-$, $I^-$, and $(ClO_4)^-$. The dissociation of the alkaline-earth metal ions tends to occur in the following order: perchlorates, iodides, bromides, and chlorides. The halide of the alkaline-earth metal may be an anhydride or a hydrate of the material described above.

Examples of the fluorine-containing compound of the alkaline-earth metal include inorganic salts such as hexafluorophosphates and tetrafluoroborates and organic salts containing, for example, a bis(trifluoromethylsulfonyl)imide anion. Examples of the anion of the fluorine-containing compound include $(CF_3SO_2)^-$, $[(CF_3SO_2)_2N]^-$, $[(C_2F_5SO_2)_2N]^-$, $[(FSO_2)_2N]^-$, $(PF_6)^-$, and $(BF_4)^-$.

The alkaline-earth metal constituting the alkaline-earth metal salt is at least one selected from the group consisting of magnesium, calcium, strontium, and barium.

In the case where the alkaline-earth metal is magnesium, examples of a magnesium halide include $MgCl_2$, $MgBr_2$, $MgI_2$, and $Mg(ClO_4)_2$. $MgCl_2$ may be, for example, δ-$MgCl_2$. Examples of a fluorine-containing magnesium compound include $Mg(CF_3SO_2)_2$, $Mg[(CF_3SO_2)_2N]_2$, $Mg[(FSO_2)_2N]_2$, $Mg[C(CF_3SO_2)_3]_2$, $Mg[N(C_2F_5SO_2)_2]_2$, $Mg[N(SO_2CF_2CF_3)_2]_2$, $Mg[PF_3(CF_2CF_3)_3]_2$, $Mg[B(C_6F_5)_4]_2$, $Mg[BF_3C_2F_5]_2$, $Mg(PF_6)_2$, $Mg(BF_4)_2$, $Mg(AsF_6)_2$, $Mg(SbF_6)_2$, and $Mg(SiF_6)_2$.

A magnesium salt may be, for example, $Mg(ClO_4)_2$ or $Mg[(CF_3SO_2)_2N]_2$. A solid electrolyte containing $Mg(ClO_4)_2$ tends to have higher ionic conductivity than a solid electrolyte containing $Mg[(CF_3SO_2)_2N]_2$. In contrast, the handling of the solid electrolyte containing $Mg[(CF_3SO_2)_2N]_2$ is safer than that of the solid electrolyte containing $Mg(ClO_4)_2$.

In the case where the alkaline-earth metal is calcium, examples of a calcium halide include $CaF_2$, $CaCl_2$, $CaBr_2$, $CaI_2$, $Ca(ClO_4)_2$, and $Ca(ClO)_2$. Examples of a fluorine-containing calcium compound include $Ca(CF_3SO_2)_2$, $Ca[(CF_3SO_2)_2N]_2$, $Ca[(C_2F_5SO_2)_2N]_2$, $Ca[(FSO_2)_2N]_2$, $Ca(PF_6)_2$, and $Ca(BF_4)_2$.

In the case where the alkaline-earth metal is strontium, examples of a strontium halide include $SrF_2$, $SrCl_2$, $SrBr_2$, $SrI_2$, and $Sr(ClO_4)_2$. Examples of a fluorine-containing strontium compound include $Sr(CF_3SO_2)_2$, $Sr[(CF_3SO_2)_2N]_2$, $Sr[(C_2F_5SO_2)_2N]_2$, $Sr[(FSO_2)_2N]_2$, $Sr(PF_6)_2$, and $Sr(BF_4)_2$.

In the case where the alkaline-earth metal is barium, examples of a barium halide include $BaCl_2$, $BaBr_2$, $BaI_2$, $Ba(ClO_4)_2$, and $Ba(ClO_3)_2$. Examples of a fluorine-containing barium compound include $Ba(CF_3SO_2)_2$, $Ba[(CF_3SO_2)_2N]_2$, $Ba[(C_2F_5SO_2)_2N]_2$, $Ba[(FSO_2)_2N]_2$, $Ba(PF_6)_2$, and $Ba(BF_4)_2$.

The shape of the matrix 11 is not particularly limited to that illustrated in FIG. 1. Various modifications of the matrix 11 will be described below.

[1-3. Inorganic Oxide Fillers]

The volume percentage of the inorganic oxide fillers 12 in the solid electrolyte 10 may be 1% or more by volume and 90% or less by volume and even 20% or more by volume and 80% or less by volume. The volume percentage of the inorganic oxide fillers 12 is, for example, about 50% by volume. The appropriate adjustment of the volume percentage of the inorganic oxide fillers 12 enables an interfacial area between the alkaline-earth metal salt and the inorganic oxide fillers 12 to be increased. This is supposed to contribute to the increase of the connection of the vacancies and/or the space charge regions, thereby improving the ionic conductivity.

The inorganic oxide fillers 12 each contain an inorganic oxide functioning as a solid acid or solid base. Examples of the inorganic oxide include aluminum oxide, silicon oxide, magnesium oxide, zinc oxide, boron oxide, titanium oxide, tin oxide, and zirconium oxide. The inorganic oxide is, for example, aluminum oxide.

The inorganic oxide may or may not have a stoichiometric composition. The inorganic oxide may consist of main constituent elements, or may contains the main constituent elements and a very small amount of impurity. Each of the inorganic oxide fillers 12 may contain two or more substances. The inorganic oxide fillers 12 may incorporate two or more fillers formed of mutually different materials.

The shapes of the inorganic oxide fillers 12 are not particularly limited to that illustrated in FIG. 1. Examples of the shapes of the inorganic oxide fillers 12 include nanoparticles, nanowires, nanotubes, and nanoplates. The solid electrolyte 10 may include, as an inorganic oxide filler 12, a mesoporous material as described below. Such a structure increases the interfacial area between the alkaline-earth metal salt and the inorganic oxide filler(s) 12 and thereby is supposed to increase the connection of the vacancies and/or the space charge regions to improve the ionic conductivity.

In the case where the inorganic oxide fillers 12 are formed of nanoparticles, the shape thereof is not limited to a spherical shape and may be another shape such as a flake shape or fibrous shape. The average particle size of the nanoparticles is, but not particularly limited to, for example, 2 nm or more and 1 µm or less. The average particle size may be 200 nm or less and even 50 nm or less. With such a structure, the ionic conductivity of the solid electrolyte 10 can be improved, because the smaller the particle size of the inorganic oxide fillers 12 is, the higher the rate of the surface area to the volume is. The average particle size of the nanoparticles is determined by measuring the long-axis lengths of particles (for example, freely-selected 10 particles) in a transmission electron micrograph (TEM image) obtained with a transmission electron microscope (TEM) and calculating the average of the long-axis lengths.

In the case where the inorganic oxide fillers 12 are formed of nanowires or nanotubes, the average diameter and the average length thereof are not particularly limited. For example, the average diameter is 2 nm or more and 1 µm or less, and the average length is 10 µm or more and 10 mm or less. The average diameter of the nanowires and the nanotubes may be 200 nm or less, even 50 nm or less. The average diameter and the average length are calculated from a TEM image in the same way as described above.

In the case where the inorganic oxide fillers 12 are formed of nanoplates, the shape thereof is, but not particularly limited to, for example, a circular shape or polygonal shape. The nanoplates have an average thickness of, for example, 2 nm or more and 1 µm or less. The average thickness may be 200 nm or less, even 50 nm or less. The average thickness is calculated from a TEM image in the same way as described above.

In the case where the inorganic oxide filler 12 is formed of a mesoporous material, the mesoporous material may have any shape as long as it includes pores. The shape of the pores may be, for example, a spherical shape or tubular shape. The network of the pores that are interconnected may be continuously formed from one end to the other end of the mesoporous material. Alternatively, each pore having tubular shape may penetrate through the mesoporous material from one end to the other end of the mesoporous material. In these cases, the alkaline-earth metal ions can move through these pores. The average pore size is, but not particularly limited to, for example, 2 nm or more and 50 nm or less. The average pore size is calculated from a TEM image in the same way as described above.

[1-4. Other Structures of Solid Electrolyte]

Figure 2A:
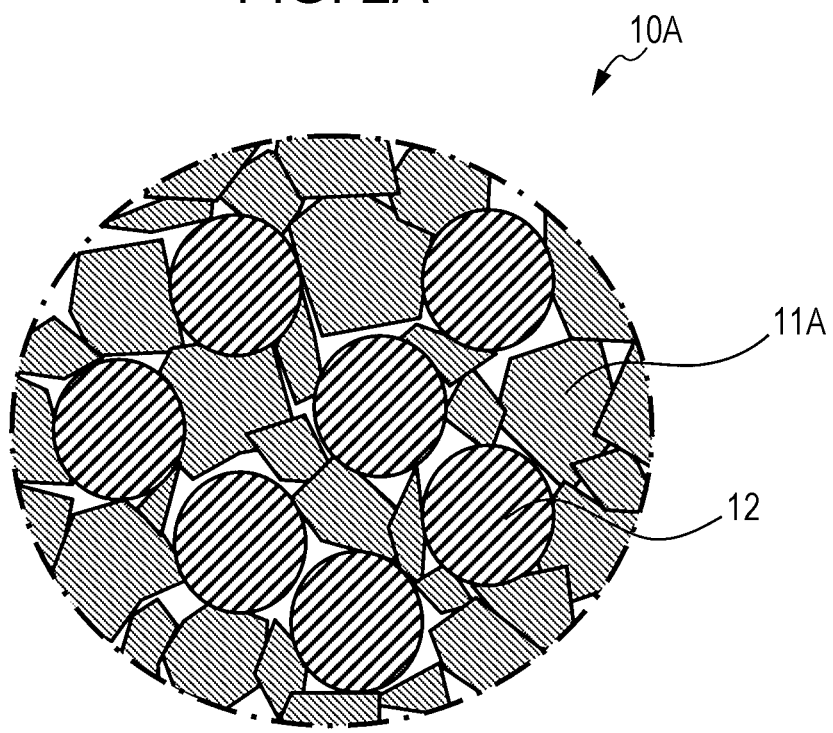
FIG. 2A is a schematic cross-sectional view of the structure of a solid electrolyte according to a first modification of an embodiment.
Figure 2B:
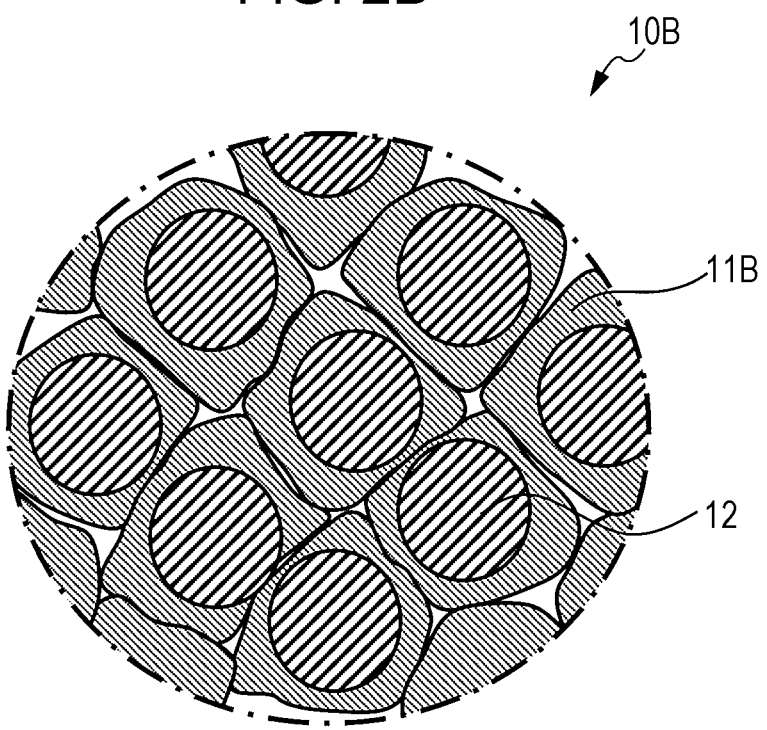
FIG. 2B is a schematic cross-sectional view of the structure of a solid electrolyte according to a second modification of an embodiment.
Figure 2C:
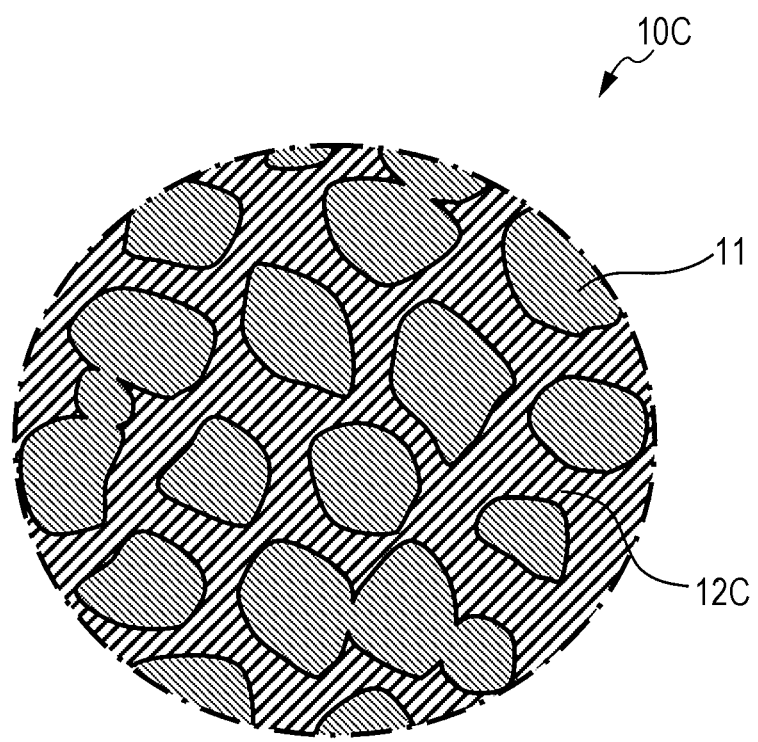
FIG. 2C is a schematic cross-sectional view of the structure of a solid electrolyte according to a third modification of an embodiment.

The shape of the matrix 11 and the shapes of the inorganic oxide fillers are not limited to examples illustrated in FIG. 1. FIGS. 2A to 2C illustrate solid electrolytes according to various modifications of the embodiment.

FIG. 2A illustrates the structure of a solid electrolyte 10A according to a first modification of the embodiment. In FIG. 2A, a matrix 11A is formed of powders. For example, the method for producing the solid electrolyte 10A includes the following steps: mixing powders containing the alkaline-earth metal salt as a solid salt with inorganic oxide particles; and pressing the mixture to fuse the powders and the inorganic oxide particles. The solid electrolyte 10A is the composite material that includes: the matrix 11A, as a solid, in which the powders containing the alkaline-earth metal salt are mutually fused; and the inorganic oxide fillers 12, as particles, which are fused to the solid. The matrix 11A illustrated in FIG. 2A includes gaps.

FIG. 2B illustrates the structure of a solid electrolyte 10B according to a second modification of the embodiment. In FIG. 2B, a matrix 11B is formed of coatings that cover the surfaces of the respective inorganic oxide fillers 12. For example, the method for producing the solid electrolyte 10B includes the following steps: dissolving the alkaline-earth metal salt in a solvent to prepare the solution containing the alkaline-earth metal salt as a dissolved salt; mixing the solution with inorganic oxide particles to cause the surfaces of the inorganic oxide particles to be coated with the solution; and drying the mixture to form coatings each containing the alkaline-earth metal salt as a solid salt on the surfaces of the respective inorganic oxide particles and to fuse the coated inorganic oxide particles with each other. The solid electrolyte 10B includes: the matrix 11B, as a solid, which is composed from the fused coatings; and the inorganic oxide fillers 12, as particles, which are fused to the solid. The matrix 11B illustrated in FIG. 2B includes gaps.

FIG. 2C illustrates the structure of a solid electrolyte 10C according to a third modification of the embodiment. In FIG. 2C, an inorganic oxide filler 12C is formed of a mesoporous material. The mesoporous material is embedded in the matrix 11. The pores of the mesoporous material are filled with the matrix 11. For example, the method for producing the solid electrolyte 10C includes the following steps: dissolving the alkaline-earth metal salt in a solvent to prepare the solution containing the alkaline-earth metal salt as a dissolved salt; impregnating the mesoporous material with the solution to fill the pores of the mesoporous material with the solution; and drying the solution to form solid phase regions each containing the alkaline-earth metal salt as a solid salt in the pores of the mesoporous material. The solid electrolyte 10C includes: the matrix 11, as a solid, which is composed from the solid phase regions, and the inorganic oxide filler 12C, as mesoporous material, which is embedded in the solid.

In the solid electrolyte 10B illustrated in FIG. 2B, almost all surfaces of the inorganic oxide fillers 12 are in contact with the matrix 11B. This structure increases a total area of the interfaces between the respective inorganic oxide fillers 12 and the matrix 11B, and thereby is supposed to increase the connection of the vacancies and/or the space charge regions to improve the ionic conductivity. The same is true for the solid electrolyte 10C illustrated in FIG. 2C.

[1-5. Method for Producing Solid Electrolyte]

An example of a method for producing the solid electrolyte 10B illustrated in FIG. 2B will be described below.

A predetermined amount of the alkaline-earth metal salt and a predetermined amount of the inorganic oxide particles are weighed. The alkaline-earth metal salt is dissolved in a solvent to prepare a solution. The inorganic oxide particles are dispersed in a dispersion medium to prepare a dispersion. The solution and the dispersion are mixed together. The mixture is sufficiently stirred to prepare a mixture containing the alkaline-earth metal salt as a dissolved salt and the inorganic oxide particles dispersed therein.

Any solvent may be used as the solvent as long as it can sufficiently dissolve the alkaline-earth metal salt. Examples of the solvent include hydrocarbon-based solvents, alcohol-based solvent, ester-based solvents, ether-based solvents, and ketone-based solvents. The solvent is, for example, methanol, ethanol, tetrahydrofuran, dimethyl ether, or acetonitrile.

Any dispersion medium may be used as the dispersion medium as long as it can sufficiently disperse the inorganic oxide particles. The dispersion medium may be a material the same as, for example, the solvent described above. The inorganic oxide particles may be subjected to pretreatment or preliminary treatment with a dispersant or surfactant before being dispersed in the dispersion medium. The materials of the dispersant and the surfactant may be, but are not particularly limited to, for example, silane coupling agents.

The mixture is heated on a hot plate under stirring to remove the solvent from the mixture, so that the coatings containing the alkaline-earth metal salt as a solid salt are formed on the surfaces of the inorganic oxide particles to fuse the coated inorganic oxide particles together.

The heating temperature is appropriately set, depending on the solvent. The heating temperature is set at, for example, a temperature equal to or lower than the boiling point of the solvent and/or the dispersion medium. This can inhibit the bumping and scattering of the mixture.

The solid matter may be further dried with a vacuum drying oven. This can completely remove the residual solvent adsorbed on the solid matter. In this case, the heating temperature may be, for example, a temperature equal to or higher than the boiling point of the solvent.

The solid matter may be ground in a mortar, thereby disintegrating the aggregation.

By the foregoing process, the solid electrolyte 10B illustrated in FIG. 2B is produced.

The foregoing process is performed in, for example, an inert atmosphere, such as a nitrogen atmosphere or an argon atmosphere, or vacuum atmosphere. This inhibits the reaction of the alkaline-earth metal salt with water and/or oxygen to inhibit the formation of a by-product that decreases the ionic conductivity.

The method for producing the solid electrolyte is not limited to the method described above.

For example, the alkaline-earth metal salt and the inorganic oxide fillers 12 may be mixed together by a known mixing method. Examples of the mixing method include a mixing method with a mortar, a mixing method by a mechanical milling method, a mixing method with a bead mill, and a mixing method with a jet mill. The mixing method may be dry mixing or wet mixing. These mixing methods can also be employed as, for example, methods for producing the solid electrolyte 10A illustrated in FIG. 2A.

For example, the inorganic oxide fillers 12 may be impregnated with the alkaline-earth metal salt by a known impregnation method. Examples of the impregnation method include chemical liquid-phase impregnation methods, such as liquid-phase impregnation methods and meld impregnation methods, and chemical vapor phase impregnation methods. In a liquid-phase impregnation method, for example, the inorganic oxide fillers 12 are impregnated with a solution containing the alkaline-earth metal salt dissolved therein. In a melt impregnation method, for example, the inorganic oxide fillers 12 are impregnated with the molten alkaline-earth metal salt. In a chemical vapor-phase impregnation method, for example, the inorganic oxide fillers 12 are impregnated with the gaseous alkaline-earth metal salt. These impregnation methods can be employed as, for example, methods for producing the solid electrolyte 10C illustrated in FIG. 2C.

For example, the matrix 11 and/or the inorganic oxide fillers 12 may be formed by a known film-forming method. Examples of the known film-forming method include sol-gen methods, metallo-organic compound decomposition (MOD) methods, atomic layer deposition (ALD) methods, chemical vapor deposition (CVD) methods, and liquid-phase film-forming methods.

[2. Secondary Battery]

Figure 3:
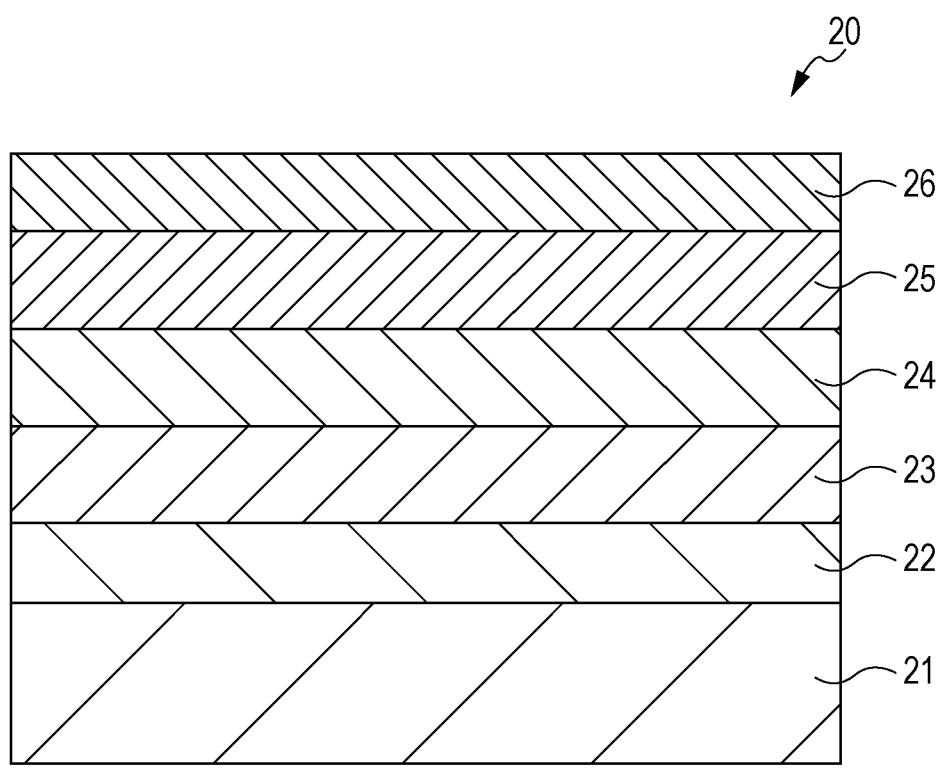
FIG. 3 is a schematic cross-sectional view of the structure of a secondary battery according to an embodiment.

FIG. 3 is a schematic cross-sectional view of the structure of a secondary battery 20 according to an embodiment.

The secondary battery 20 includes a substrate 21, a positive electrode current collector 22, a positive electrode active material layer 23, a solid electrolyte 24, a negative electrode active material layer 25, and a negative electrode current collector 26. In this structure, the positive electrode current collector 22 and the positive electrode active material layer 23 constitute a positive electrode, and the negative electrode active material layer 25 and the negative electrode current collector 26 constitute a negative electrode. The solid electrolyte 24 may be arranged between the positive electrode and the negative electrode. In addition to the solid electrolyte 24, an intermediate layer may be provided therebetween. Alkaline-earth metal ions can migrate between the positive electrode and the negative electrode through the solid electrolyte 24.

The substrate 21 may be an insulating substrate or a conductive substrate. The substrate 21 may be a substrate that remains unchanged when an inorganic or organic layer is formed thereon. Examples of the substrate 21 include glass substrates, plastic substrates, polymer films, silicon substrates, metal plates, metal foil sheets, and laminates thereof. The substrate 21 may be a commercially available substrate or a substrate produced by a known method.

The positive electrode current collector 22 is composed of an electronic conductor that does not chemically reacting with an ionic conductor contained in the positive electrode active material layer 23 in the range of the operating voltage of the secondary battery 20. The operating voltage of the positive electrode current collector 22 may be in the range of, for example, +1.5 V to +4.5 V with respect to the standard redox potential of the alkaline-earth metal. The material of the positive electrode current collector 22 is, for example, a metal or an alloy. More specifically, the material of the positive electrode current collector 22 may be a metal or an alloy containing at least one metal element selected from the group consisting of copper, chromium, nickel, titanium, platinum, gold, aluminum, tungsten, iron, and molybdenum. The material of the positive electrode current collector 22 may be, for example, aluminum, an aluminum alloy, platinum, or gold in view of conductivity, resistance to the ionic conductor, and the redox potential. In the case where the substrate 21 is composed of a conductive material and also serves as the positive electrode current collector 22, the positive electrode current collector 22 may be omitted.

The positive electrode current collector 22 may be formed of a transparent conductive film. Examples of the transparent conductive film include indium-tin oxide (ITO), indium-zinc oxide (IZO), fluorine-doped tin oxide (FTO), antimonydoped tin oxide (ATO), indium oxide ($In_2O_3$), tin oxide ($SnO_2$), and Al-containing ZnO.

The positive electrode current collector 22 may be formed of a laminated film including the metal and/or the transparent conductive film.

The positive electrode active material layer 23 contains a positive electrode active material capable of occluding and releasing the alkaline-earth metal ions.

For example, in the case where the alkaline-earth metal is magnesium, any material may be used as the positive electrode active material as long as it occludes and releases magnesium ions. In this case, examples of the positive electrode active material include metal oxides, polyanionic salt compounds, sulfides, chalcogenide compounds, and hydrides. Examples of the metal oxides include transition metal oxides such as $V_2O_5$, $MnO_2$, and $MoO_3$ and magnesium composite oxides such as $MgCoO_2$ and $MgNiO_2$. Examples of the polyoanionic salt compounds include $MgCoSiO_4$, $MgMnSiO_4$, $MgFeSiO_4$, $MgNiSiO_4$, $MgCo_2O_4$, and $MgMn_2O_4$. An example of the sulfides is $Mo_6S_8$. An example of the chalcogenide compounds is $Mo_9Se_{11}$.

For example, in the case where the alkaline-earth metal is calcium, any material may be used as the positive electrode active material as long as it occludes and releases calcium ions. In this case, examples of the positive electrode active material include metal oxides, polyanionic salt compounds, sulfides, chalcogenide compounds, hydrides, and complexes. Examples of the metal oxides include transition metal oxides such as $V_2O_5$ and calcium composite oxides such as $CaCoO_2$. Examples of the polyoanionic salt compounds include $CaCoSiO_4$, $CaMnSiO_4$, $CaFeSiO_4$, and $CaNiSiO_4$. An example of the complexes is $K_2BaFe(CN)_6$.

For example, in the case where the alkaline-earth metal is strontium, any material may be used as the positive electrode active material as long as it occludes and releases strontium ions. In this case, examples of the positive electrode active material include metal oxides, polyanionic salt compounds, sulfides, chalcogenide compounds, and hydrides. Examples of the metal oxides include transition metal oxides such as $V_2O_5$ and strontium composite compounds such as $SrFeO_2$. Examples of the polyoanionic salt compounds include $SrCoSiO_4$, $SrMnSiO_4$, $SrFeSiO_4$, and $SrNiSiO_4$.

For example, in the case where the alkaline-earth metal is barium, any material may be used as the positive electrode active material as long as it occludes and releases barium ions. In this case, examples of the positive electrode active material include metal oxides, polyanionic salt compounds, sulfides, chalcogenide compounds, and hydrides. Examples of the metal oxides include transition metal oxides such as $V_2O_5$ and barium composite compounds such as $BaCoO_2$. Examples of the polyoanionic salt compounds include $BaCoSiO_4$, $BaMnSiO_4$, $BaFeSiO_4$, and $BaNiSiO_4$.

The positive electrode active material is, for example, a crystalline material. The positive electrode active material layer 23 may contain two or more positive electrode active materials.

The positive electrode active material layer 23 may contain, for example, a conductive material and a binder, as needed.

Any material may be used as the conductive material as long as it is an electron conductive material. Examples of the conductive material include carbon materials, metals, and conductive polymers. Examples of the carbon materials include graphites such as natural graphites, e.g., massive graphite and flake graphite, and artificial graphites, acetylene black, carbon black, Ketjenblack, carbon whiskers, needle coke, and carbon fibers. Examples of the metal include copper, nickel, aluminum, silver, and gold. These materials may be used alone or in combination as a mixture of two or more. The conductive material may be, for example, carbon black or acetylene black in view of electron conductivity and coatability.

Any binder may be used as long as it functions to hold the particles of the active material and the particles of the conductive material. Examples of the binder include fluorine-containing resins such as polytetrafluoroethylene (PTFE), poly(vinylidene fluoride) (PVdF), and fluorine-containing rubber, thermoplastic resins such as polypropylene and polyethylene, ethylene-propylene-diene monomer (EPDM) rubber, sulfonated EPDM rubber, and natural butyl rubber (NBR). These materials may be used alone or in combination as a mixture of two or more. The binder may be, for example, an aqueous dispersion of a cellulosic material or styrene-butadiene rubber (SBR).

Examples of a solvent in which the positive electrode active material, the conductive material, and the binder are dispersed include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. For example, a thickner may be added to the dispersion medium. Examples of the thickner include carboxymethyl cellulose and methylcellulose.

For example, the positive electrode is formed as follows: The positive electrode active material, the conductive material, and the binder are mixed together. An appropriate solvent is added to the mixture to form a positive electrode material in paste form. The positive electrode material is applied to a surface of the positive electrode current collector and dried, thereby forming the positive electrode. The positive electrode material may be pressed in order to increase the current density.

The thickness of the positive electrode is, but not particularly limited to, for example, 1 μm or more and 100 μm or less.

The solid electrolyte 24 is the same as, for example, any of the solid electrolytes 10, 10A, 10B, and 10C described above. Thus, the description is not redundantly repeated.

The negative electrode active material layer 25 may contain a negative electrode active material capable of occluding and releasing the alkaline-earth metal ions. Alternatively, the negative electrode may cause the alkaline-earth metal, as a negative electrode active material, to be precipitated thereon and dissolved therefrom. In the latter case, the negative electrode may or may not include the negative electrode active material layer 25 in a complete discharge state.

For example, in the case where the alkaline-earth metal is magnesium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include magnesium, tin, bismuth, and antimony. Examples of the alloys include alloys of magnesium and at least one selected from aluminum, silicon, gallium, zinc, tin, manganese, bismuth, and antimony.

For example, in the case where the alkaline-earth metal is calcium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke.

Examples of the metals include calcium, tin, bismuth, and antimony. Examples of the alloys include alloys of calcium and at least one selected from aluminum, silicon, gallium, germanium, zinc, tin, manganese, bismuth, and antimony.

For example, in the case where the alkaline-earth metal is strontium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include strontium, tin, bismuth, and antimony. Examples of the alloys include alloys of strontium and at least one selected from aluminum, silicon, gallium, germanium, zinc, tin, manganese, bismuth, and antimony.

For example, in the case where the alkaline-earth metal is barium, examples of the negative electrode active material include metals, alloys, sulfides, carbon, organic compounds, inorganic compounds, metal complexes, and organic polymer compounds. Examples of the carbon include graphite and non-graphite carbon such as hard carbon and coke. Examples of the metals include barium, tin, bismuth, and antimony. Examples of the alloys include alloys of barium and at least one selected from aluminum, silicon, gallium, germanium, zinc, tin, manganese, bismuth, and antimony.

The negative electrode active material layer 25 may contain two or more negative electrode active materials.

The negative electrode active material layer 25 may contain, for example, a conductive material and a binder, as needed. The conductive material, the binder, the solvent, and the thickner used for the positive electrode active material layer 23 can be appropriately used for the negative electrode active material layer 25.

The thickness of the negative electrode is, but not particularly limited to, for example, 1 μm or more and 50 μm or less.

The negative electrode current collector 26 is composed of an electronic conductor that does not chemically reacting with an ionic conductor contained in the negative electrode active material layer 25 in the range of the operating voltage of the secondary battery 20. The operating voltage of the negative electrode current collector 26 may be in the range of, for example, 0 V to +1.5 V with respect to the standard redox potential of the alkaline-earth metal. The material for the positive electrode current collector 22 can be appropriately used for the negative electrode current collector 26.

The positive electrode current collector 22, the positive electrode active material layer 23, the negative electrode active material layer 25, and the negative electrode current collector 26 can be formed by, for example, a physical deposition method or chemical deposition method. Examples of the physical deposition method include a sputtering method, a vacuum deposition method, an ion plating method, and a pulsed laser deposition (PLD) method. Examples of the chemical deposition method include an atomic layer deposition (ALD) method, a chemical vapor deposition (CVD) method, a liquid-phase film-forming method, a sol-gel method, a metallo-organic compound decomposition (MOD) method, a spray pyrolysis decomposition (SPD) method, a doctor blade method, a spin coating method, and a printing technique. Examples of the CVD method include a plasma-enhanced CVD method, a thermal CVD method, and a laser CVD method. An example of the liquid-phase film-forming method is wet plating. Examples of the wet plating include electroplating, immersion plating, and electroless plating.

The positive electrode current collector 22 and the negative electrode current collector 26 having a plate-like shape or foil-like shape can also be used.

A method for producing the secondary battery 20 is not particularly limited as long as the foregoing secondary battery 20 can be produced. A similar method to a common method for producing a secondary battery may be employed. For example, the material of the positive electrode, the material of the solid electrolyte 24, and the material of the negative electrode are pressed in sequence to produce a secondary battery element. This secondary battery element is placed in a battery case. The battery case is sealed by crimping to provide the secondary battery 20.

The secondary battery 20 may have, for example, a rectangular shape, a circular shape, an elliptic shape or a hexagonal shape in plan view. The secondary battery 20 may have a cylindrical, prismatic, button-like, coin-like, or flat-shaped structure.

[3. Experimental Results]

[3-1. First Experiment]

In a first experiment, various solid electrolytes 10 containing magnesium chloride as the matrix 11 and aluminum oxide as the inorganic oxide fillers 12 were produced, and the ionic conductivity was evaluated.

[3-1-1. Production of Samples]

Sample A was produced by a procedure described below.

Magnesium chloride anhydride ($MgCl_2$) and aluminum oxide ($Al_2O_3$) were provided. The aluminum oxide was formed of particles having an average particle size of 31 nm. These materials were weighed in such a manner that the volume percentage of $Al_2O_3$ was 20% by volume with respect to the total volume of $MgCl_2$ and $Al_2O_3$. The weighed $MgCl_2$ was dissolved in tetrahydrofuran (THF) to prepare a solution having a concentration of 0.2 M. The weighed $Al_2O_3$ was dispersed in THF to prepare a dispersion having a concentration of 0.2 M. The solution and the dispersion were mixed together. The mixture was sealed in a bottle under nitrogen and stirred in the bottle at 50° C. for 24 hours. The mixture was heated at 50° C. on a hot plate under stirring, thereby removing the solvent component from the mixture to give a solid containing $MgCl_2$ and $Al_2O_3$. The solid was vacuum-dried at 120° C. for 5 hours with a vacuum dryer to give sample A.

Samples B, C, and D were produced in the same way as sample A, except that different volume percentages of $Al_2O_3$ were used. The volume percentages of $Al_2O_3$ in samples B, C, and D were 33%, 50%, and 80% by volume, respectively. Sample E was produced in the same way as sample A, except that the volume percentage of $Al_2O_3$ was 0% by volume, i.e., $Al_2O_3$ was not mixed.

Each of samples A to D corresponds to the solid electrolyte 10 according to an example of the embodiment. Sample E corresponds to a comparative example.

[3-1-2. Ionic Conductivity]

The ionic conductivity of each of samples A to E was evaluated by alternating current impedance measurement.

Evaluation pellets were produced from samples A to E by a procedure as described below. Each of the samples was appropriately weighed in a glove box filled with a nitrogen atmosphere. The weighed samples were placed in polyethylene carbonate) tubes having an inside diameter of 10 mm, an outside diameter of 30 mm, and a height of 20 mm. Each of the samples was held by a jig composed of stainless steel (SUS304, specified by Japanese Industrial Standards). Each sample was pressed at a pressure of 6 N/cm² with a uniaxial pressing machine (P-16B, available from RIKEN SEIKI) via the jig to form a pellet having a diameter of 10 mm and a freely-selected thickness. The jig was set to another jig for fixation with the pellet held. Thus, the pellet was fixed in a state being pressed at a pressure of 5 N/cm². The pellet was introduced together with the jig into a gastight container while the state is maintained. The gastight container was filled with a nitrogen atmosphere, and the nitrogen atmosphere was maintained. Electrode terminals arranged outside the gastight container were electrically connected to the jig in the gastight container through lead lines.

The pellet of each sample was subjected to impedance measurement. An electrochemical measurement system (Modulab, available from Solartron Analytical) was used as a measurement device. A compact environmental tester (SH-242, available from Espec Corp.) was used as a constant-temperature unit. The alternating current impedance of each of the samples was measured at an alternating voltage of 100 to 200 mV and a temperature of 20° C. to 80° C. in a frequency range of 0.01 Hz to 1 MHz. This measurement revealed the resistance of the pellet of each sample in the direction normal to a main surface of the pellet. The resistance was converted into ionic conductivity to obtain the ionic conductivity of each of samples A to E.

Figure 4:
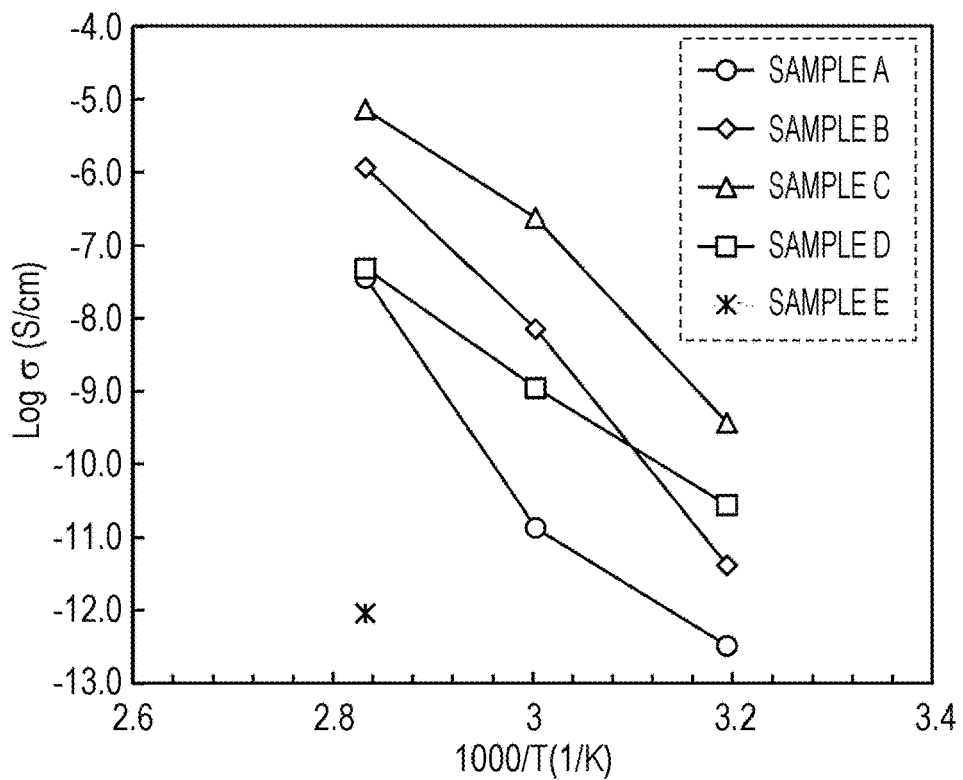
FIG. 4 is a graph illustrating the relationships between the temperature and the ionic conductivity of samples A to E.

FIG. 4 illustrates the relationships between the temperature and the ionic conductivity of samples A to E. As illustrated in FIG. 4, each of samples A to D containing $Al_2O_3$ particles as the inorganic oxide fillers 12 had higher ionic conductivity than sample E that did not contain $Al_2O_3$ particles.

[3-2. Second Experiment]

In a second experiment, various solid electrolytes 10 containing magnesium perchlorate as the matrix 11 and aluminum oxide as the inorganic oxide fillers 12 were produced, and the ionic conductivity was evaluated.

[3-2-1. Production of Samples]

Samples F, G, and H were produced in the same way as sample A, except that magnesium perchlorate ($Mg(ClO_4)_2$) was used as the alkaline-earth metal salt and that different volume percentages of $Al_2O_3$ were used. The volume percentages of $Al_2O_3$ in samples F, G, and H were 20%, 50%, and 80% by volume with respect to the total volume of $Mg(ClO_4)_2$ and $Al_2O_3$. Sample I was produced in the same way as sample E, except that $Mg(ClO_4)_2$ was used as the alkaline-earth metal salt.

Each of samples F to H corresponds to the solid electrolyte 10 according to an example of the embodiment. Sample I corresponds to a comparative example.

[3-2-2. Ionic Conductivity]

The ionic conductivity of each of samples F to I was evaluated by the same method as in the first experiment.

Figure 5:
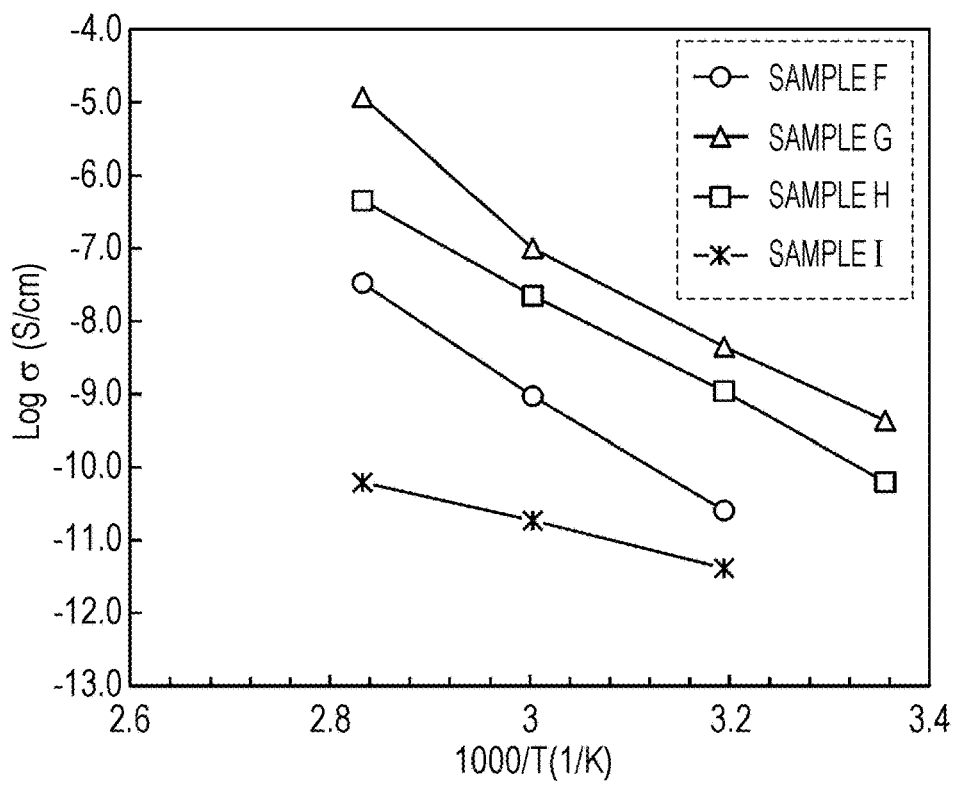
FIG. 5 is a graph illustrating the relationships between the temperature and the ionic conductivity of samples F to I.

FIG. 5 illustrates the relationships between the temperature and the ionic conductivity of samples F to I. As illustrated in FIG. 5, each of samples F to H containing $Al_2O_3$ particles as the inorganic oxide fillers 12 had higher ionic conductivity than sample I that did not contain $Al_2O_3$ particles.

[3-3. Third Experiment]

In a third experiment, various solid electrolytes 10 containing magnesium bromide as the matrix 11 and aluminum oxide as the inorganic oxide fillers 12 were produced, and the ionic conductivity was evaluated.

[3-3-1. Production of Samples]

Samples J, K, and L were produced in the same way as sample A, except that magnesium bromide ($MgBr_2$) was used as the alkaline-earth metal salt and that different volume percentages of $Al_2O_3$ were used. The volume percentages of $Al_2O_3$ in samples J, K, and L were 20%, 50%, and 80% by volume with respect to the total volume of $MgBr_2$ and $Al_2O_3$.

Each of samples J to L corresponds to the solid electrolyte 10 according to an example of the embodiment.

[3-3-2. Ionic Conductivity]

The ionic conductivity of each of samples J to L was evaluated by the same method as in the first experiment.

Figure 6:
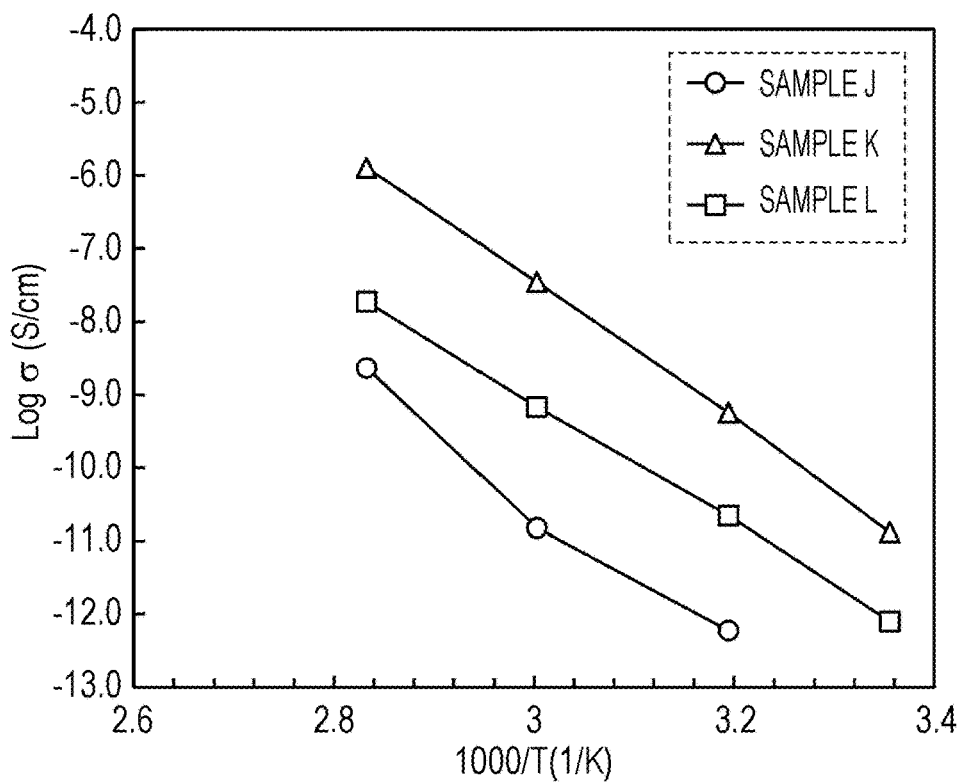
FIG. 6 is a graph illustrating the relationships between the temperature and the ionic conductivity of samples J to L.

FIG. 6 illustrates the relationships between the temperature and the ionic conductivity of samples J to L. As illustrated in FIG. 6, each of samples J to L had higher ionic conductivity than, for example, samples E and I.

[3-4. Fourth Experiment]

In a fourth experiment, various solid electrolytes 10 containing magnesium bis(trifluoromethanesulfonyl)imide as the matrix 11 and aluminum oxide as the inorganic oxide fillers 12 were produced, and the ionic conductivity was evaluated.

[3-4-1. Production of Samples]

Samples M, N, and O were produced in the same way as sample A, except that magnesium bis(trifluoromethanesulfonyl)imide ($Mg[(CF_3SO_2)]_2N_2$, $Mg(TFSI)_2$) was used as the alkaline-earth metal salt and that different volume percentages of $Al_2O_3$ were used. The volume percentages of $Al_2O_3$ in samples M, N, and O were 20%, 50%, and 80% by volume with respect to the total volume of $Mg(TFSI)_2$ and $Al_2O_3$.

Each of samples M to O corresponds to the solid electrolyte 10 according to an example of the embodiment.

[3-4-2. Ionic Conductivity]

The ionic conductivity of each of samples M to O was evaluated by the same method as in the first experiment.

Figure 7:
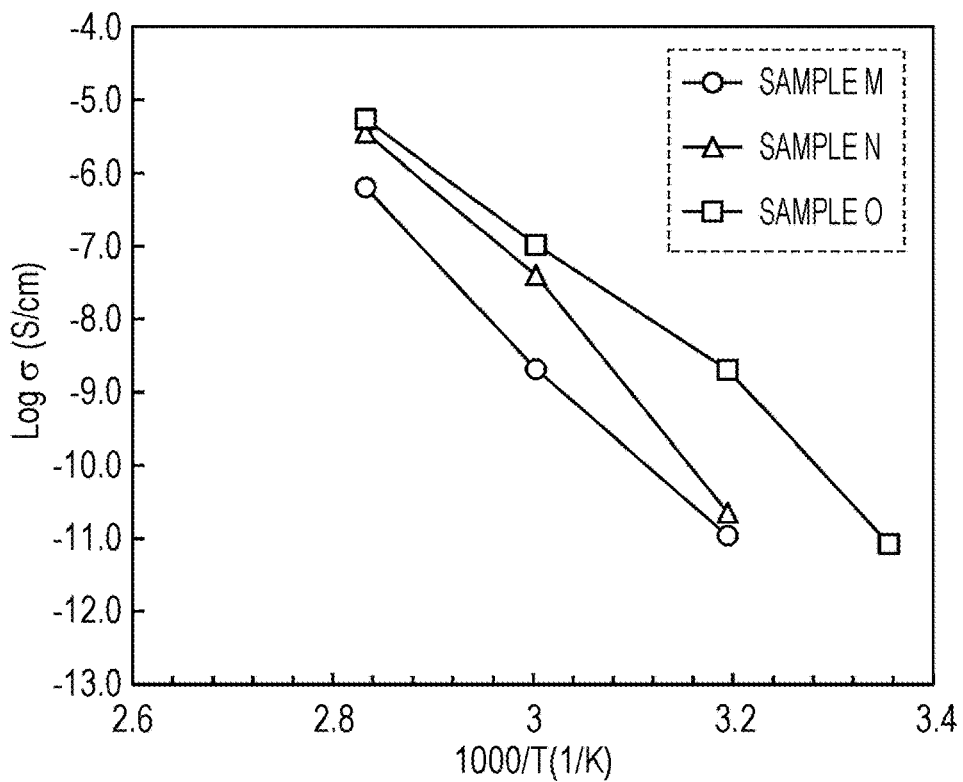
FIG. 7 is a graph illustrating the relationships between the temperature and the ionic conductivity of samples M to O.

FIG. 7 illustrates the relationships between the temperature and the ionic conductivity of samples M to O. As illustrated in FIG. 7, each of samples M to O had higher ionic conductivity than, for example, samples E and I.

[3-5. Fifth Experiment]

In a fifth experiment, the solid electrolyte 10 containing magnesium chloride as the matrix 11 and silicon oxide as the inorganic oxide fillers 12 was produced, and the ionic conductivity was evaluated.

[3-5-1. Production of Sample]

Sample P was produced in the same way as sample A, except that silicon dioxide ($SiO_2$, average particle size: 15 nm) was used as the inorganic oxide fillers 12 and that the volume percentage of $SiO_2$ was 33% by volume with respect to the total volume of $MgCl_2$ and $SiO_2$.

Sample P corresponds to the solid electrolyte 10 according to an example of the embodiment.

[3-5-2. Ionic Conductivity]

The ionic conductivity of sample P was evaluated by the same method as in the first experiment.

Sample P had an ionic conductivity of about $7.2 \times 10^{-8}$ S/cm at 80° C. Sample P containing $SiO_2$ as the inorganic oxide fillers 12 had higher ionic conductivity than sample E that did not contain the inorganic oxide fillers 12.

[3-6. Sixth Experiment]

In a sixth experiment, the solid electrolyte 10 containing magnesium chloride as the matrix 11 and magnesium oxide as the inorganic oxide fillers 12 was produced, and the ionic conductivity was evaluated.

[3-6-1. Production of Sample]

Sample Q was produced in the same way as sample A, except that magnesium oxide (MgO, average particle size: 51 nm) was used as the inorganic oxide fillers 12 and that the volume percentage of MgO was 33% by volume with respect to the total of $MgCl_2$ and MgO.

Sample Q corresponds to the solid electrolyte 10 according to an example of the embodiment.

[3-6-2. Ionic Conductivity]

The ionic conductivity of sample Q was evaluated by the same method as in the first experiment.

Sample Q had an ionic conductivity of about $1.9 \times 10^{-7}$ S/cm at 80° C. Sample Q containing MgO as the inorganic oxide fillers 12 had higher ionic conductivity than sample E that did not contain the inorganic oxide fillers 12.

[3-7. Volume Percentage of Inorganic Oxide Fillers and Ionic Conductivity]

Figure 8:
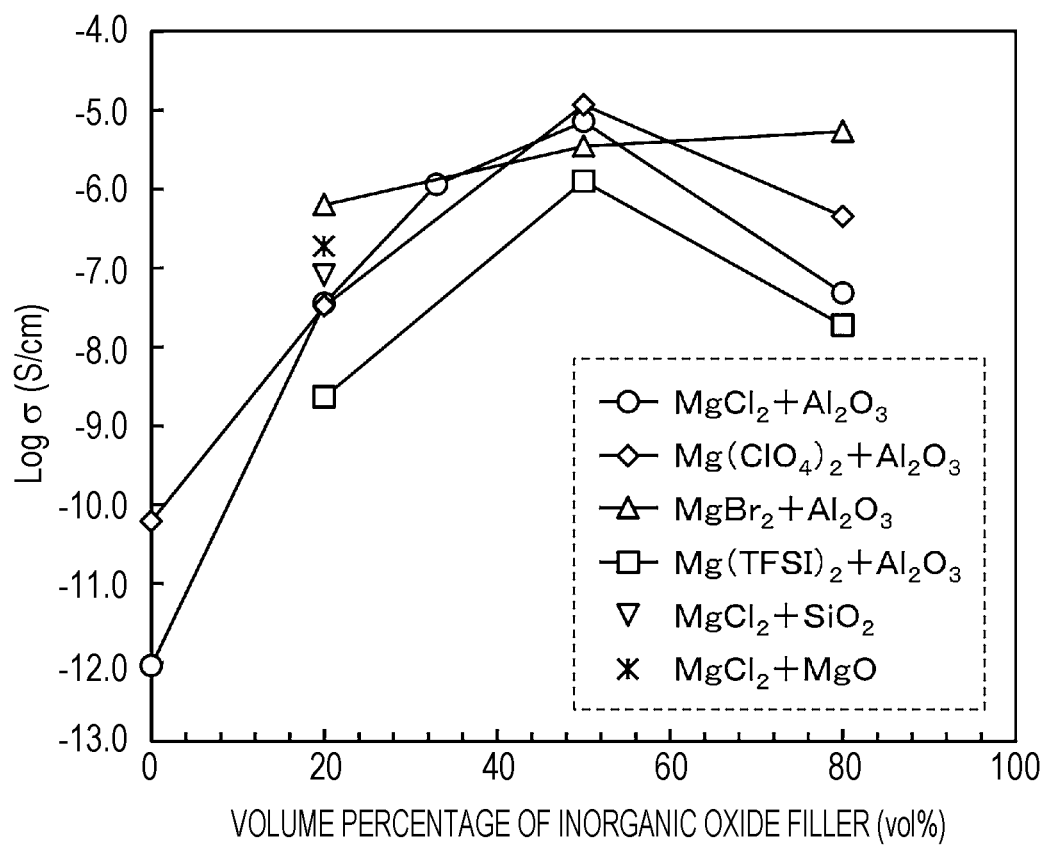
FIG. 8 is a graph illustrating the relationships between the volume percentage of inorganic oxide fillers and the ionic conductivity of samples A to Q.

FIG. 8 illustrates the relationships between the volume percentages of the inorganic oxide fillers 12 in samples A to Q and the ionic conductivity at 80° C.

As illustrated in FIG. 8, the samples containing the inorganic oxide fillers 12 and the magnesium halides or the fluorine-containing magnesium compound had an ionic conductivity of $10^{-9}$ S/cm or more, regardless of the type or volume percentage of the materials. In contrast, the samples that did not contain the inorganic oxide fillers 12 had an ionic conductivity of less than $10^{-10}$ S/cm.

As illustrated in FIG. 8, furthermore, the samples containing the inorganic oxide fillers 12 and the magnesium halides had an ionic conductivity of $10^{-8}$ S/cm or more. In particular, the samples containing $Al_2O_3$ and the magnesium halides had a high ionic conductivity of $10^{-6}$ S/cm or more when, for example, the volume percentage of $Al_2O_3$ was 50% by volume.

The maximum ionic conductivity of each of the samples containing the inorganic oxide fillers 12 and magnesium chloride or the fluorine-containing magnesium compound was observed at a volume percentage of the inorganic oxide fillers 12 of about 50% by volume.

[3-8. Analysis of Cross Section]

Figure 9:
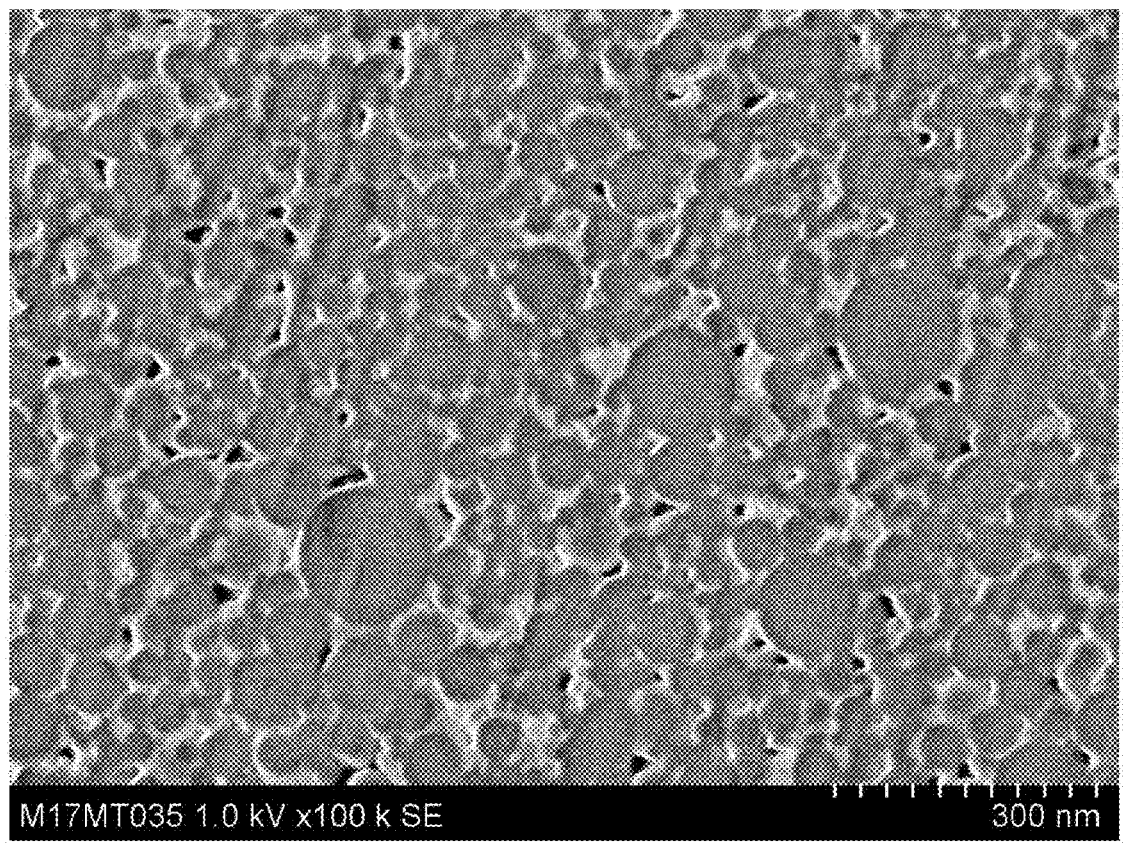
FIG. 9 is a cross-sectional scanning electron microscope (SEM) image of the pellet of sample C captured with a scanning electron microscope (SEM).

FIG. 9 illustrates is a cross-sectional scanning electron microscope (SEM) image of the pellet of sample C captured with a scanning electron microscope (SEM).

In FIG. 9, circular dark regions indicate cross sections of the inorganic oxide fillers 12. Light regions around them indicate a cross section of the matrix 11. Black regions in FIG. 9 indicate gaps in the matrix 11.

In an example illustrated in FIG. 9, the inorganic oxide fillers 12 were substantially uniformly dispersed in the matrix 11. The magnesium salt serving as the matrix 11 was in direct contact with the surfaces of the inorganic oxide fillers 12 and formed regions continuously covering the surfaces.

[3-9. Supplement]

The foregoing experimental results confirm that the solid electrolyte 10 containing the matrix 11 composed of the magnesium salt and the inorganic oxide fillers 12 in the form of particles has good ionic conductivity. This effect is attributed to the presence of the inorganic oxide fillers 12; thus, it is presumed that the same effect is also provided when another alkaline-earth metal salt exemplified in Section [1-2. Matrix] is used. As described above, the improvement in ionic conductivity is supposed to be attributed to the interfaces between the matrix 11 and the inorganic oxide fillers 12; thus, the inorganic oxide fillers 12 having another shape can exhibit the same effect as long as the interfaces can be ensured.

In the foregoing experimental results, a similar tendency in the improvement in ionic conductivity is obtained, regardless of the type of the anion of the magnesium salt or the type of the inorganic oxide fillers 12. Thus, for example, even in the case where the matrix 11 contains different types of alkaline-earth metal salts and/or the inorganic oxide fillers 12 contains different types of inorganic oxides, the solid electrolyte 10 is supposed to exhibit improved ionic conductivity.

What is claimed is:

1. A solid electrolyte comprising:
   a matrix containing, as a solid magnesium salt, at least one selected from the group consisting of magnesium chloride, magnesium bromide, magnesium perchlorate, and a metal compound containing magnesium and fluorine; and
   one or more fillers embedded in the matrix,
   wherein the one or more fillers contain an inorganic oxide, and
   wherein a content of the magnesium salt in the matrix is greater than 50 weight %.

2. The solid electrolyte according to claim 1, wherein the solid electrolyte is formed of a layer having a thickness of 100 nm or more and 50 µm or less.

3. The solid electrolyte according to claim 1, wherein the matrix contains, as the solid magnesium salt, at least one selected from the group consisting of $Mg(CF_3SO_2)_2$, $Mg[(CF_3SO_2)_2N]_2$, $Mg[(C_2F_5SO_2)_2N]_2$, $Mg[(FSO_2)_2N]_2$, $Mg(PF_6)_2$, and $Mg(BF_4)_2$.

4. The solid electrolyte according to claim 1,
   wherein the solid magnesium salt is not in a state dissolved in a solvent or polymer.

5. The solid electrolyte according to claim 1, wherein the one or more fillers contain at least one selected from the group consisting of aluminum oxide, silicon oxide, magnesium oxide, zinc oxide, boron oxide, titanium oxide, tin oxide, and zirconium oxide.

6. The solid electrolyte according to claim 1, wherein a content of the filler in the matrix is greater than 20 volume %.

7. The solid electrolyte according to claim 1, wherein the one or more fillers are particles dispersed in the matrix.

8. The solid electrolyte according to claim 7, wherein the particles have an average particle size of 2 nm or more and 1 µm or less.

9. A secondary battery comprising:
   a positive electrode;
   a negative electrode; and
   the solid electrolyte according to claim 1.

10. The secondary battery according to claim 9, wherein the positive electrode, the solid electrolyte, and the negative electrode are stacked together.

* * * * *